Dec. 23, 1958 S. SHERR 2,866,090
SIGNAL-TO-NOISE RATIO DETECTOR USING FREQUENCY SHIFT LOCAL OSCILLATOR TO ALTERNATELY SAMPLE SIGNAL AND NOISE
Filed July 7, 1955
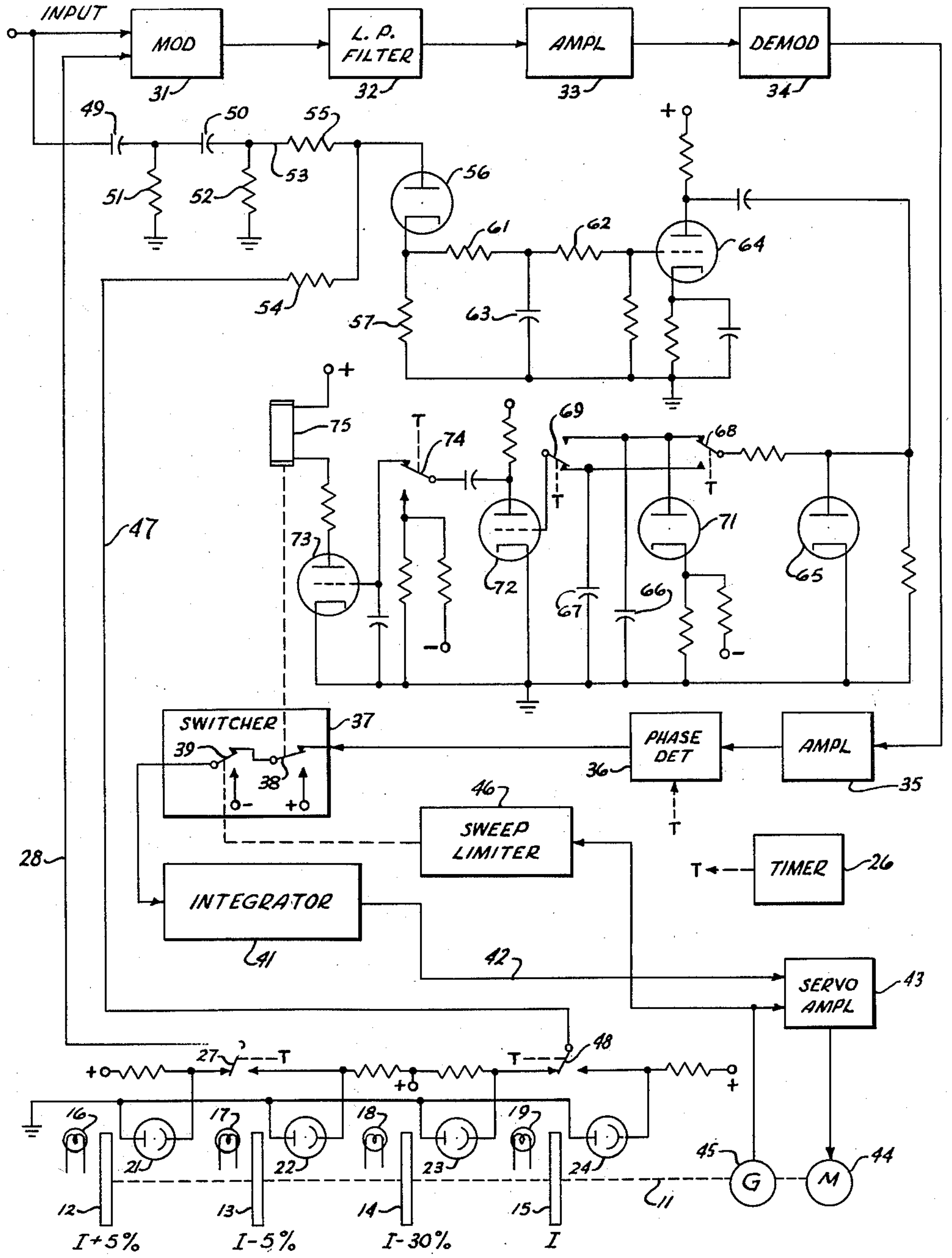
INVENTOR.
SOLOMON SHERR
BY H. L. Mackey
ATTORNEY 2,866,090
Patented Dec. 23, 1958

2,866,090

SIGNAL-TO-NOISE RATIO DETECTOR USING FREQUENCY SHIFT LOCAL OSCILLATOR TO ALTERNATELY SAMPLE SIGNAL AND NOISE

Solomon Sherr, Yonkers, N. Y., assignor to General Precision Laboratory Incorporated, a corporation of New York Application July 7, 1955, Serial No. 520,468

8 Claims. (Cl. 250—20)

This invention relates to a device for detecting the signal-to-noise ratio in an electrical circuit.

Electronic equipment is frequently required to perform some function, such as measurement or control in response to an input signal. However, if the input signal is so weak as to be obscured by spurious voltages, called noise, the equipment cannot operate properly, and it is therefore frequently desirable to determine when the signal-to-noise ratio is so low as to render the operation of the equipment unreliable. The present invention is of general application but will be described in connection with a frequency tracker.

A frequency tracker is a device which accepts an input ratio signal comprising a narrow fluctuating band of frequencies and delivers continuously an output indicative of the central frequency of the input signal. A frequency tracker is useful, for example, in Doppler navigation systems and in frequency modulated altimeters for measuring the difference in frequency between the transmitted and received signals.

A typical frequency tracker employs a modulator in which are mixed the input signal and a locally generated signal. The output of the modulator controls the frequency of the locally generated signal and maintains it either displaced from the input signal by a fixed amount or equal to that of the input signal. Trackers of the latter class are said to employ a "zero frequency discriminator" because the difference in frequency between the input signal and the locally generated signal is zero.

If the signal-to-noise ratio of the input signal drops to too low a value, the operation of the frequency tracker becomes erratic and the frequency indications become unreliable. It is therefore usual to provide apparatus for detecting the signal-to-noise ratio in order to alter the operation of the tracker so that the tracker may scan the spectrum in search of the signal. Such a detector is the subject of the present invention, and will be described in connection with a frequency tracker employing a zero frequency discriminator, although it is applicable to other types of trackers and other types of equipment.

The copending application of Newsom and Huntington, Serial No. 371,608, filed July 31, 1953, for Frequency Tracker, describes and claims a frequency tracker employing a zero frequency discriminator and including a signal-to-noise detector. The noise voltage in that detector is obtained by connecting the input to a band-pass filter which is tuned to pass a narrow band of frequencies outside the range of any expected input signal. The signal plus noise voltage is obtained from the output of the low-pass filter which follows the modulator. The two voltages are compared and the resultant controls the initiation of the search mode of operation.

A signal-to-noise ratio detector as briefly described above and as fully described in the aforementioned copending application Serial No. 371,608 can be adjusted to operate entirely satisfactorily but is subject to the disadvantage that it is difficult to construct several units each having the same operating characteristics. This disadvantage is caused principally by three factors. First, the detector compares two voltages having different shaped frequency spectrums, the signal plus noise voltage having the spectrum shape characteristic of a low-pass filter while the noise voltage has the spectrum shape characteristic of a band-pass filter. Second, the noise sample and the signal plus noise sample pass through different channels so that variations in the parameters of one channel affect one sample only. Third, the band-pass filter requires an inductance with a high Q, which is difficult to reproduce exactly.

An object of this invention is to provide an improved signal-to-noise ratio detector.

Another object is to provide a signal-to-noise ratio detector having operating characteristics which can be reproduced readily.

A more specific object is to provide an improved signal-to-noise ratio detector suitable for use in a frequency tracker employing a zero frequency discriminator.

A specific embodiment of the invention may be briefly described as follows. The frequency tracker in this example obtains two voltages differing in frequency by approximately 10% from two optical or magnetic tone wheels mounted on a common shaft. These voltages are applied alternately to a first modulator where they are mixed with the input signal. The output of the modulator controls the speed of the motor driving the tone wheels so that the frequencies of the two voltages lie equally above and below the central frequency of the input signal. The signal-to-noise ratio detector employs two additional tone wheels on the same shaft, the frequency of one of which is equal to that of the input and the frequency of the other being on the order of 30% lower. The voltages from these tone wheels are alternately applied to a second modulator where they are mixed with the input signal. The output of this modulator is passed through a low-pass filter whereby there is obtained a voltage which is alternately proportional to noise only and to signal plus noise.

For a clearer understanding of the invention, reference may be made to the following detailed description and the accompanying drawing, the single figure of which is a diagram, partially schematic and partially in block form, of a frequency tracker incorporating the novel signal-to-noise ratio detector of the present invention.

Referring now to the drawing, there is shown a shaft 11 on which are mounted four tone wheels 12, 13, 14 and 15. These wheels are arranged with their associated apparatus to generate four voltages of different frequencies, each of which is proportional to the speed of rotation of the shaft 11. When the apparatus is properly following the input signal, the frequency of wheel 12 is equal to the input frequency plus about 5%; that of wheel 13 is equal to the input minus about 5%; that of wheel 14 is the input minus about 30% and that of wheel 15 is equal to the input frequency. The wheels may each comprise a disc having alternately arranged transparent and opaque segments and are provided with light sources 16, 17, 18 and 19 on one side and photo sensitive elements 21, 22, 23 and 24 on the other side. The showing in the drawing is schematic only and it will be understood that the actual construction may depart from that shown. For example, a single disc having four concentric rings could be used in which case one light source would suffice. The photo sensitive elements may be any of several known types but at present it is preferred to use photo sensitive semi-conductive devices, commonly called photo transistors. In this case, each photo transistor is connected across a D.-C. source through a load resistor and the variations in the potential of one terminal of the resistor constitutes the output.

A timer 26 is provided to operate various switches cyclically. The timer may, for example, comprise a free running multivibrator having a relay winding in one anode circuit which winding operates the various switches through a mechanical connection indicated schematically by the letter T. The frequency of operation is not critical, but should be much lower than that of any expected input signal. In one embodiment, a frequency of 2 C. P. S. has been found satisfactory.

The voltages derived from tone wheels 12 and 13 are selected alternately by a switch 27 and applied via a conductor 28 to a modulator 31 where they are mixed with the input signal. If the two frequencies on conductor 28 do not lie equally above and below that of the input, the difference term appearing in the output of the modulator 31 will shift abruptly in frequency at the rate of the timer 26. The output of the modulator 31 is passed through a low-pass filter 32 where the higher frequency is attenuated more than the lower. After passing through an amplifier 33, the envelope of the signal is recovered by means of a demodulator 34 and further amplified by an amplifier 35, the output of which is a square wave the amplitude and phase of which are indicative of the extent and sign of the tracking error. A phase detector 36, controlled by the timer 26, converts this signal to a D.-C. voltage the magnitude and sign of which constitute a tracking error signal. This signal passes through a switcher 37, the two switches 38 and 39 of which will be assumed for the moment to be in the positions shown in the drawing, to an integrator 41 which delivers an output proportional to the time integral of the input. The integrator 41 may comprise a high gain, direct coupled "Miller feedback" amplifier, and its output is led by a conductor 42 to a servo amplifier 43 which controls a motor 44 which rotates the shaft 11. A generator 45 also mounted on the shaft 11 delivers an output of constant frequency the magnitude of which is proportional to the speed of rotation of the shaft 11 and this output is also led to the servo amplifier 43. The motor 44, the generator 45 and the amplifier 43 constitute a rate servo so that the shaft 11 is rotated at a speed proportional to the voltage of conductor 42. This speed is adjusted until the frequencies of tone wheels 12 and 13 "straddle" that of the input at which time the input to the integrator 41 falls to zero and the output remains constant at its last attained value.

The operation will continue as above described unless the signal level drops, or the noise level rises, or both, to such an extent that the signal can no longer be detected. When this occurs it is necessary to scan the spectrum until the signal again is found. A signal-to-noise ratio detector is therefore provided which operates the switch 38 to the position opposite to that shown in the drawing when the signal-to-noise ratio becomes too low. This places a high positive potential on the integrator input causing the motor 44 to slow down to its lowest speed at which time the voltage of the generator 45 will have fallen sufficiently to cause a sweep limiter circuit 46 to operate the switch 39 thereby placing a negative potential on the input to the integrator 41 and speeding up the motor 44 to its highest value. The time constants of the circuit are adjusted so that the rising voltage of generator 45 will cause the switch 39 to be returned to the position shown when the motor 44 has reached its highest speed.

The circuits for and operation of a frequency tracker employing a zero frequency discriminator are more fully described in the aforementioned copending application Serial No. 371,608 but have been briefly described herein in order to explain the setting of the present invention. The signal-to-noise ratio detector described in that application obtains its noise voltage from a band-pass filter connected to the input and obtains its signal plus noise voltage from the low-pass filter, which arrangement leads to the difficulties discussed previously in this specification. In the present invention, the voltages generated by the tone wheels 14 and 15, the frequencies of which are 30% below the input frequency and equal to the input frequency, respectively, are alternately applied to a conductor 47 by a switch 48 operated by the timer 26.

The input signal is led through a high pass filter comprising series capacitors 49 and 50 and shunt resistors 51 and 52 to a conductor 53. This filter is to remove the portion of the spectrum near zero frequency which contains no useful information and may, for example, be designed to pass frequencies from one kilocycle up and to attenuate all lower frequencies. The voltages of conductors 47 and 53 are combined through resistors 54 and 55 and applied to the anode of a modulating diode 56 containing a load resistor 57 in its cathode circuit. The input voltage is not a single frequency but is a band of frequencies mixed with broad band noise to that when the switch 48 is sampling the voltage of tone wheel 15, the voltage across resistor 57 will comprise a broad spectrum due to the noise in conductor 53 and also a narrow spectrum just above zero frequency due to the signal in conductor 53. When the switch 48 is sampling the voltage of tone wheel 14, the voltage across resistor 57 will comprise a broad spectrum due to noise in conductor 53 and also a narrow spectrum centered about a point the frequency of which is above zero frequency by approximately 30% of the input. For example, if at some moment, the input signal is centered about 4,000 cycles, the frequency of the tone wheel 14 will be 2,800 cycles and the narrow spectrum just referred to will be centered about 1,200 cycles.

The voltage across resistor 57 is passed through a low-pass filter shown as comprising series resistors 61 and 62 and a shunt capacitor 63. When the switch 48 is sampling the voltage of tone wheel 15, the filter passes the narrow spectrum of signal plus noise near zero and cuts off the remainder of the noise. When tone wheel 14 is sampled, the filter passes a narrow spectrum of noise near zero and cuts off the narrow spectrum containing the signal. The output of the low-pass filter thus consists alternately of (1) a spectrum representing the amplitude of signal plus noise and (2) a spectrum representing the amplitude of noise only. These two spectra have identical shapes since both have been passed through the same low-pass filter.

The remainder of the apparatus may be similar to that described in the aforementioned copending application Serial No. 371,608 and will be but briefly described herein. The signals from the low-pass filter are passed through an amplifying stage comprising a triode 64 and the envelope is recovered by means of a demodulating diode 65 which yields a pulsating unidirectional voltage the two distinct components of which represent noise amplitude and signal plus noise amplitude respectively. These components are smoothed by means of an electromechanical filter comprising capacitors 66 and 67 and switches 68 and 69 operated by the timer 26. During one half cycle the switch 68 applies the noise voltage to capacitor 66 while the switch 69 is sampling the voltage of capacitor 67. On the other half cycle the switch 68 applies the signal plus noise voltage to capacitor 67 while the switch 69 samples the voltage of capaictor 66. The diode 71 prevents the charge on capacitor 66 from falling below a predetermined magnitude so that the noise voltage "seen" by switch 69 never falls below this minimum value. The square wave on switch 69 is amplified by a triode 72 and the positive half cycles representing signal plus noise are applied to the grid of a triode 73 by means of a switch 74 operated by the timer 26 so as to maintain triode 73 conductive as long as the signal-to-noise ratio is favorable. Conduction of triode 73 energizes a relay winding 75 which holds the switch 38 in its normal position as shown in the drawing.

It can be seen that the signal-to-noise ratio detector of the present invention is an arrangement which can be reproduced readily from unit to unit. First, both the noise and the signal plus noise channels are identical except for the tone wheels and the photo sensitive elements and uniformity in these elements is easily attained. Variations in such elements as the demodulating diode and the low-pass filter affect both signals equally. Second, the shape of the frequency spectrum of the two signals is identical. Third, no sensitive high Q inductances are required. The simple resistance-capacitance filter is readily reproduced.

Although a specific embodiment has been described, many modifications may be made within the scope of the invention. For example, magnetic tone wheels could be used in place of the optical tone wheels described. Other types of modulators could be used, although the simple modulator described is adequate for the purpose. Many other modifications will occur to those skilled in the art.

What is claimed is:

1. Apparatus for detecting the signal-to-noise ratio of an input signal comprising, means for generating a first voltage having a frequency equal to that of said input signal, means for generating a second voltage having a frequency different from but proportional to that of said first voltage, means for mixing said input signal alternately with said first and second voltages, and a low-pass filter connected to the output of said last named means.

2. Apparatus for detecting the signal-to-noise ratio of an input signal comprising, means for generating a first voltage having a frequency equal to that of said input signal, means for generating a second voltage having a frequency different from but proportional to that of said first voltage, a modulator, means for applying said input signal to said modulator, means for alternately applying said first and second voltages to said modulator, a low-pass filter connected to the output of said modulator for deriving a third voltage alternately proportional to signal plus noise and to noise, and means for comparing the noise and the signal plus noise components of said third voltage.

3. Apparatus for detecting the signal-to-noise ratio of an input signal comprising, means for generating a first voltage having a frequency equal to that of said input signal, means for generating a second voltage having a frequency different from but proportional to that of said first voltage, a modulator, means for applying said input signal to said modulator, switch means for alternately applying said first and second voltages to said modulator, a low-pass filter connected to the output of said modulator whereby the output of said low-pass filter consists alternately of first and second components indicative of the amplitude of signal plus noise and of noise, respectively, and means for comparing the amplitude of said first and second components.

4. Apparatus for comparing the amplitude of an alternating current input signal with the amplitude of the background noise accompanying said signal comprising, means for generating a first voltage having a frequency equal to that of said input signal, means for generating a second voltage having a frequency different from but proportional to that of said first voltage, a modulator, means for applying said input signal to said modulator, means for alternately applying said first and second voltages to said modulator, and a low-pass filter connected to the output of said modulator.

5. Apparatus for comparing the amplitude of an alternating current input signal with the amplitude of the background noise accompanying said signal comprising, means for generating a first voltage having a frequency equal to that of said input signal, means for generating a second voltage having a frequency different from but proportional to that of said first voltage, a modulator, means for applying said input signal to said modulator, cyclically operated switch means for applying said first and second voltages alternately to said modulator, and a low-pass filter connected to the output of said modulator.

6. Apparatus for comparing the amplitude of an alternating current input signal with the amplitude of the background noise accompanying said signal comprising, means for generating a first voltage having a frequency equal to that of said input signal, means for generating a second voltage having a frequency different from but proportional to that of said first voltage, a modulator, means for applying said input signal to said modulator, switch means for selectively applying either said first or said second voltage to said modulator, timing means for cyclically operating said switch means, a low-pass filter connected to the output of said modulator whereby the output of said low-pass filter consists alternately of first and second components indicative of the amplitude of signal plus noise and of noise, respectively, and a demodulator connected to said low-pass filter for deriving an alternating current voltage the magnitude of which is indicative of the difference in magnitude of said first and second components.

7. Apparatus for comparing the amplitude of an alternating current input signal with the amplitude of the background noise accompanying said signal comprising, means for generating a first voltage having a frequency equal to that of said input signal, means for generating a second voltage having a frequency different from but proportional to that of said first voltage, a modulator, means for applying said input signal to said modulator, cyclically operated switch means for applying said first and second voltages alternately to said modulator, a low-pass filter connected to the output of said modulator, and a demodulator connected to said low-pass filter for deriving an alternating current voltage the magnitude of which represents the signal-to-noise ratio.

8. Apparatus for comparing the amplitude of an alternating current input signal consisting of a fluctuating narrow band of frequencies with the amplitude of the background noise accompanying said signal, comprising, means for generating continuously a first alternating voltage equal in frequency to the mean frequency of said input signal, means for generating continuously a second voltage differing in frequency from said first voltage by a fixed percentage, a modulator, means for applying said input signal to said modulator, switch means for selectively applying either said first or said second voltage to said modulator, timing means for cyclically operating said switch means, a low-pass filter connected to the output of said modulator, whereby the output of said low-pass filter consists alternately of first and second components indicative of the amplitude of signal plus noise and of noise, respectively, and a demodulator connected to said low-pass filter for deriving an alternating current voltage the magnitude of which is indicative of the difference in magnitudes of said first and second components whereby the amplitude and phase of said alternating current voltage represents the signal-to-noise ratio.

References Cited in the file of this patent

UNITED STATES PATENTS

| | | |
|---|---|---|
| 2,000,142 | Loewenstein | May 7, 1935 |
| 2,104,635 | Breedlove | Jan. 4, 1938 |
| 2,620,438 | Cotsworth | Dec. 2, 1952 |
| 2,691,098 | Selove | Oct. 5, 1954 |